(12) United States Patent
Nakashima et al.

(10) Patent No.: US 10,520,079 B2
(45) Date of Patent: Dec. 31, 2019

(54) TRANSMISSION CONTROLLER

(71) Applicant: KAWASAKI JUKOGYO KABUSHIKI KAISHA, Kobe-shi, Hyogo (JP)

(72) Inventors: Kenichi Nakashima, Kobe (JP); Yukinobu Kohno, Kako-gun (JP); Tatsuhiko Goi, Kobe (JP)

(73) Assignee: KAWASAKI JUKOGYO KABUSHIKI KAISHA, Kobe-shi, Hyogo (JP)

( * ) Notice: Subject to any disclaimer, the term of this patent is extended or adjusted under 35 U.S.C. 154(b) by 0 days.

(21) Appl. No.: 16/082,656

(22) PCT Filed: Mar. 8, 2016

(86) PCT No.: PCT/JP2016/001254
§ 371 (c)(1),
(2) Date: Sep. 6, 2018

(87) PCT Pub. No.: WO2017/154037
PCT Pub. Date: Sep. 14, 2017

(65) Prior Publication Data
US 2019/0032776 A1 Jan. 31, 2019

(51) Int. Cl.
*F16H 61/664* (2006.01)
*F16H 61/02* (2006.01)
(Continued)

(52) U.S. Cl.
CPC ......... *F16H 61/0276* (2013.01); *F16H 59/44* (2013.01); *F16H 61/0206* (2013.01);
(Continued)

(58) Field of Classification Search
CPC .......... F16H 59/42; F16H 59/68; F16H 61/02; F16H 61/0202; F16H 61/664
See application file for complete search history.

(56) References Cited

U.S. PATENT DOCUMENTS 5,669,845 A 9/1997 Muramoto et al.
2002/0002778 A1* 1/2002 Ikeda ................. F16H 15/38
33/520

(Continued)

FOREIGN PATENT DOCUMENTS

JP 8-270772 A 10/1996
JP 2002-349691 A 12/2002
(Continued)

OTHER PUBLICATIONS

International Search Report for PCT/JP2016/001254, dated Jun. 14, 2016.

*Primary Examiner* — Edwin A Young
(74) *Attorney, Agent, or Firm* — Sughrue Mion, PLLC

(57) ABSTRACT

A transmission controller comprises an actuator which changes a roller position of a toroidal CVT to adjust the tilt motion angle of a power roller; a tilt motion angle information generation unit which generates information of the tilt motion angle; a position estimation unit which derives an estimated value of the roller position; and a position control unit which derives an operation command value of the actuator so that a deviation between a command value of the roller position and the estimated value of the roller position is cancelled. The position estimation unit is configured to derive the estimated value based on the information of the tilt motion angle which is generated by the tilt motion angle information generation unit, and the operation command value, and to compensate the estimated value based on an environment parameter which affects an operation of the power roller.

16 Claims, 11 Drawing Sheets

(51) Int. Cl.
 *F16H 59/44* (2006.01)
 *B60W 10/109* (2012.01)
 *B60W 20/30* (2016.01)
 *F16H 61/662* (2006.01)

(52) U.S. Cl.
 CPC ....... *F16H 61/0213* (2013.01); *B60W 10/109* (2013.01); *B60W 20/30* (2013.01); *F16H 61/66259* (2013.01)

(56) References Cited

U.S. PATENT DOCUMENTS

| | | | |
|---|---|---|---|
| 2002/0161503 A1 | 10/2002 | Joe et al. | |
| 2002/0173403 A1* | 11/2002 | Kohno | F16H 61/6648 477/37 |
| 2007/0142163 A1* | 6/2007 | Murray | F16H 59/48 476/42 |
| 2010/0200692 A1 | 8/2010 | Goi et al. | |

FOREIGN PATENT DOCUMENTS

| | | |
|---|---|---|
| JP | 2004-364459 A | 12/2004 |
| JP | 2005-337462 A | 12/2005 |
| JP | 3914999 B2 | 5/2007 |
| JP | 2010-179815 A | 8/2010 |

\* cited by examiner

TRANSMISSION CONTROLLER

CROSS REFERENCE TO RELATED APPLICATIONS

This Application is a National Stage of International Application No. PCT/JP2016/001254 filed Mar. 8, 2016.

TECHNICAL FIELD

The present invention relates to a transmission controller which controls a transmission ratio of a toroidal continuously variable transmission (toroidal CVT).

BACKGROUND ART

A toroidal continuously variable transmission (toroidal CVT) includes power rollers disposed in a cavity formed by an input disc and an output disc. The power rollers are driven by an actuator and displaced such that the power rollers are tilted within the cavity. A transmission ratio (transmission gear ratio) of the toroidal CVT is continuously changed by changing tilt motion angles of the power rollers.

In a case where the transmission ratio of the toroidal CVT is controlled, target roller positions are derived so that a deviation between an actual transmission ratio and a target transmission ratio can be cancelled, and an operation command value of an actuator is derived so that deviations between actual roller positions and the target roller positions can be cancelled. To simplify a hardware for controlling the transmission ratio, a method of estimating the actual roller positions based on as inputs tilt motion angles of the power rollers and the operation command value of the actuator has been conventionally proposed (e.g., see Patent Literature 1).

CITATION LIST

Patent Literature

Patent Literature 1: Japanese Patent No. 3914999

SUMMARY OF INVENTION

Technical Problem

In the method in an actual situation, there is a room for improvement in estimation accuracy of the actual roller positions, and hence there is a room for improvement in control accuracy of the transmission ratio.

An object of the present invention is to improve estimation accuracy of roller positions.

Solution to Problem

According to an aspect of the present invention, there is provided a transmission controller which controls a transmission ratio (transmission gear ratio) of a toroidal continuously variable transmission which continuously changes the transmission ratio based on a tilt motion angle of a power roller, the transmission controller comprising: an actuator which changes a roller position of the power roller to adjust the tilt motion angle; a tilt motion angle information generation unit which generates information of the tilt motion angle; a position estimation unit which derives an estimated value of the roller position; and a position control unit which derives an operation command value of the actuator so that a deviation between a command value of the roller position and the estimated value of the roller position is cancelled, wherein the position estimation unit is configured to derive the estimated value based on the information of the tilt motion angle which is generated by the tilt motion angle information generation unit, and the operation command value, and to compensate the estimated value based on an environment parameter which affects an operation of the power roller.

In accordance with this configuration, the position estimation unit compensates the estimated value of the roller position in view of the environment parameter which affects the operation of the parameter, independently of the tilt motion angle and the operation command value. In other words, in a case where the environment parameter changes under the condition in which the tilt motion angle is equal and the operation command value is equal, the estimated value of the roller position is adjusted in response to the change in the environment parameter. Therefore, estimation accuracy of the roller position can be improved, and a transmission control can be improved.

In the above-described transmission controller, the toroidal continuously variable transmission may constitute a part of a driving power transmission path which transmits driving power of an engine rotary shaft of an aircraft to an electric generator mounted in the aircraft, and the driving power transmission path may not include a path which bypasses the toroidal continuously variable transmission.

The actuator may be a hydraulic actuator, and the environment parameter may include a hydraulic oil temperature of the actuator.

The toroidal continuously variable transmission may include a clamping mechanism which generates a clamping force for pushing the power roller against an input disc and an output disc, and the environment parameter may include the clamping force.

The environment parameter may include an input rotation speed of the toroidal continuously variable transmission.

The tilt motion angle information generation unit may be constituted by an estimated angle estimation unit which generates an estimated value of the tilt motion angle as the information of the tilt motion angle, and the estimated angle estimation unit may include an actual transmission ratio calculation unit which derives an actual transmission ratio of the toroidal continuously variable transmission, and a converting unit which derives the estimated value of the tilt motion angle based on the actual transmission ratio derived by the actual transmission ratio calculation unit, with reference to a inverse function of the tilt motion angle with respect to the actual transmission ratio.

Advantageous Effects of Invention

In accordance with the present invention, estimation accuracy of the roller position can be improved.

DESCRIPTION OF EMBODIMENTS

Hereinafter, the embodiments of the present invention will be described with reference to the drawings. Throughout the drawings, the same or corresponding constituents are designated by the same reference symbols and will not be described in detail repeatedly.

Embodiment 1

[IDG]

Figure 1:
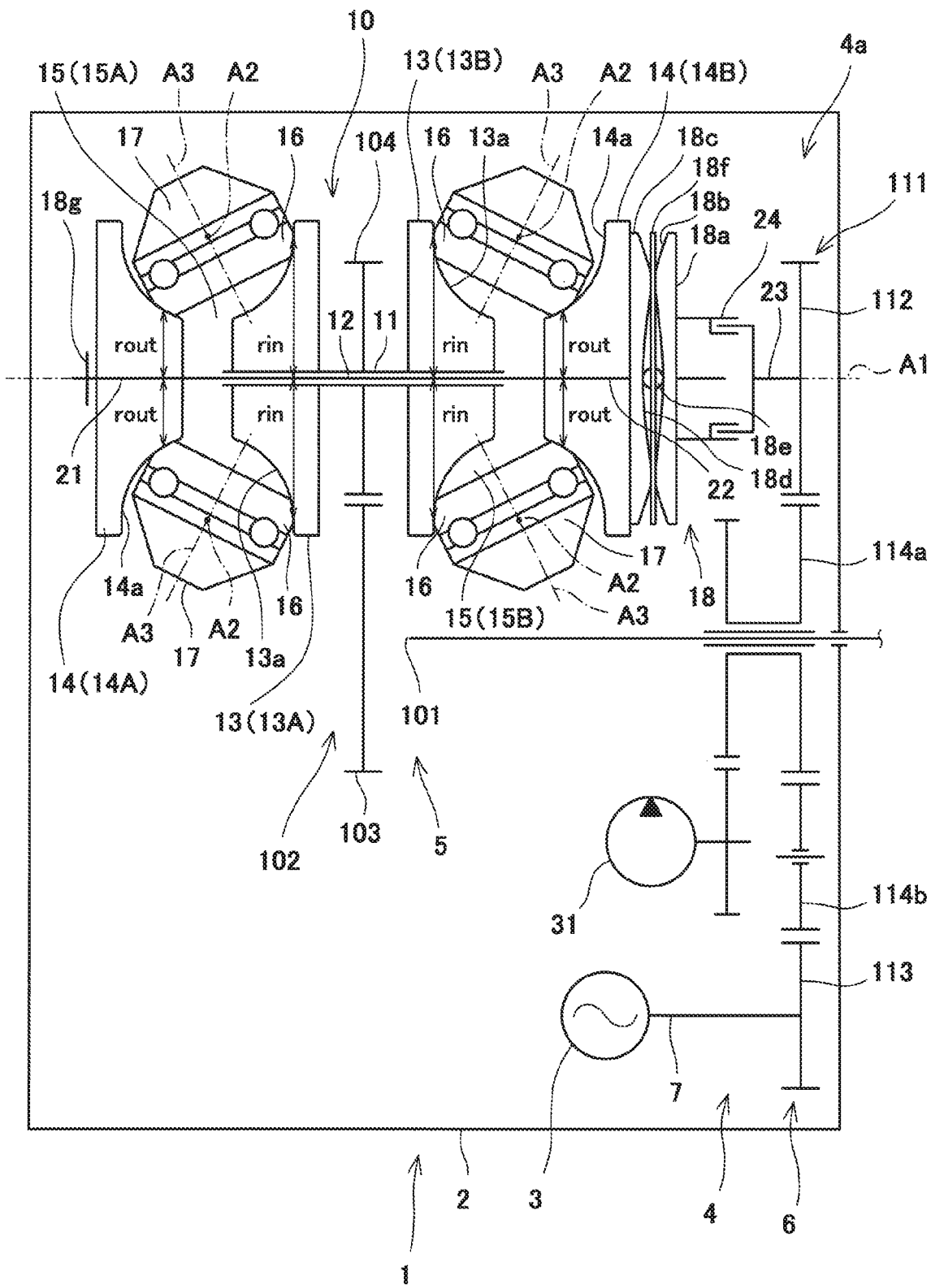
FIG. 1 is a skeleton diagram of an integrated drive generator (IDG) according to Embodiment 1.

FIG. 1 is a skeleton diagram of an integrated drive generator (hereinafter will be referred to as "IDG") 1 according to Embodiment 1. The IDG1 is used as an AC power supply for an aircraft. The IDG 1 includes a casing 2 mounted on an engine (not shown) of the aircraft. The casing 2 accommodates therein an electric generator (power generator) 3, and a constant speed drive (hereinafter will be referred to as "CSD") 4 including a toroidal continuously variable transmission 10 (hereinafter will be referred to as "toroidal CVT").

The casing 2 includes in an inside thereof an oil sump (not shown) which reserves therein oil used for multiple purposes. The uses of the oil are, for example, traction drive by the toroidal CVT 10, actuation of hydraulic devices or hydraulic mechanisms, cooling of the electric generator 3, and lubrication of the CSD 4.

The CSD 4 constitutes a driving power transmission path 4a which transmits rotational driving power of an engine rotary shaft (not shown) to the electric generator 3. The toroidal CVT 10 constitutes a part of the driving power transmission path 4a. The driving power transmission path 4a includes an input path 5 connecting the engine rotary shaft to the toroidal CVT 10, and an output path 6 connecting the toroidal CVT 10 to the generator shaft 7. The input path 5 and the output path 6 include members (e.g., shafts and gears) which are rotatable to transmit the driving power.

The CSD 4 drives the electric generator 3 at a constant speed based on the rotational driving power of the engine rotary shaft (not shown). In the IDG1, the rotational driving power is input from the engine rotary shaft to the toroidal CVT 10 via the input path 5. The toroidal CVT 10 changes the rotational driving power, and outputs the changed driving power to the generator shaft 7 via the output path 6. When the generator shaft 7 rotates, the electric generator 3 generates AC power at a frequency which is proportional to the rotation speed of the generator shaft 7. A transmission ratio (transmission gear ratio) of the toroidal CVT 10 is continuously changed so that the rotation speed of the generator shaft 7 is maintained at a proper value (value corresponding to a frequency (e.g., 400 Hz) that is suitable to actuate the electric components within the aircraft), irrespective of a change (fluctuation) of the rotation speed of the engine rotary shaft. In this way, the frequency is maintained at a constant proper value.

[Toroidal CVT]

As shown in FIG. 1, the toroidal CVT 10 includes a CVT input shaft 11, a CVT output shaft 12, input discs 13, output discs 14, power rollers 16, trunnions 17, and a clamping mechanism 18.

The two shafts 11, 12 are placed coaxially on a CVT axis line A1. The input discs 13 are provided on and integrated with the CVT input shaft 11. The output discs 14 are provided on the CVT output shaft 12 and integrated with the CVT output shaft 12. One set of the input disc 13 and the output disc 14 are disposed to face each other in the extension direction of the CVT axis line A1, and form one cavity 15. The cavity 15 is defined by surfaces 13a, 14a of the discs 13, 14, the surfaces 13a, 14a facing each other. The cavity 15 has an annular shape in which the cavity 15 is continuous in a circumferential direction, in a radially outward region of the two shafts 11, 12.

A plurality of (e.g., two) power rollers 16 are disposed within one cavity 15 in such a manner that the power rollers 16 are substantially equally spaced apart from each other in the circumferential direction. The trunnions 17 correspond to the power rollers 16, respectively, in a one-to-one correspondence. The trunnions 17 are supported by the casing 2 so that each of the trunnions 17 is rotatable around a tilt motion axis line A2 and displaceable in the extension direction of the tilt motion axis line A2. The power rollers 16 are supported by the trunnions 17, respectively, in such a manner that each of the power rollers 16 is rotatable around a rolling motion axis line A3. The power rollers 16 are disposed within the cavity 15 in a state in which the power rollers 16 are displaceable in the extension direction of the tilt motion axis lines A2, rotatable (tiltable, revolvable) around the tilt motion axis lines A2, and rotatable (rotatable around their axes) around the rolling motion axis lines A3. The power rollers 16 are configured to contact the surfaces 13a, 14a of the input and output discs 13, 14.

Hereinafter, contact regions of the power rollers 16 and the surface 13 a will be referred to as "input side contact regions", contact regions of the power rollers 16 and the surface 14a will be referred to as "output side contact regions", a distance from the CVT axis line A1 to each of the input side contact regions will be referred to as "input side contact region radius rin", a distance from the CVT axis line A1 to each of the output side contact regions will be referred to as "output side contact region radius rout", and a ratio of the input side contact region radius rin to the output side contact region radius rout will be referred to as "radius ratio" (radius ratio=rin/rout). Positions of the power rollers 16 in the extension direction of the tilt motion axis lines A2 will be referred to as "roller positions X". Rotation angles of the power rollers 16 around the tilt motion axis lines A2 will be referred to as "tilt motion angles φ".

The oil reserved in the casing 2 is supplied to the surfaces of the power rollers 16, as traction oil. The power rollers 16 are pushed against the input discs 13 and the output discs 14 by a clamping force generated in the extension direction of the CVT axis line A1, by the clamping mechanism 18. This allows an oil film (membrane) with a high viscosity to be formed in the input side contact regions and the output side contact regions. In this state, the toroidal CVT 10 can transmit the rotation of the CVT input shaft 11 to the CVT output shaft 12 by the traction drive. When the CVT input shaft 11 rotates, the input discs 13 rotate together with the CVT input shaft 11, and the power rollers 16 are driven to rotate around the tilt motion axis lines A2 by a shear resistance of the oil film which is generated in the input side contact regions. When the power rollers 16 rotate around the rolling motion axis lines A3, the output discs 14 are driven to rotate by a shear resistance of the oil film which is generated in the outside contact regions. The CVT output shaft 12 rotates together with the output discs 14.

The transmission ratio of the toroidal CVT 10 is a ratio of a rotation speed NCVTout of the output disc 14 to a rotation speed NCVTin of the input disc 13 and is equal to the above-described radius ratio (transmission ratio=NCVTout/NCVTin=rin/rout). The transmission ratio is continuously changed depending on the tilt motion angles φ. The tilt motion angles φ are continuously changed depending on the roller positions X. When the roller positions X are changed, a side slip occurs in the power rollers 16. The power rollers 16 rotate around the tilt motion axis lines A2 until the side slip is ceased. Thus, the tilt motion angles φ are changed. With the change in the tilt motion angles φ, the input side contact regions and the output side contact regions are displaced on the surfaces 13a, 14a, and the input side contact region radiuses rin and the output side contact region radiuses rout are continuously changed. In this way, the radius ratio, namely the transmission ratio of the toroidal CVT 10 is continuously changed.

[Actuator]

Figure 2:
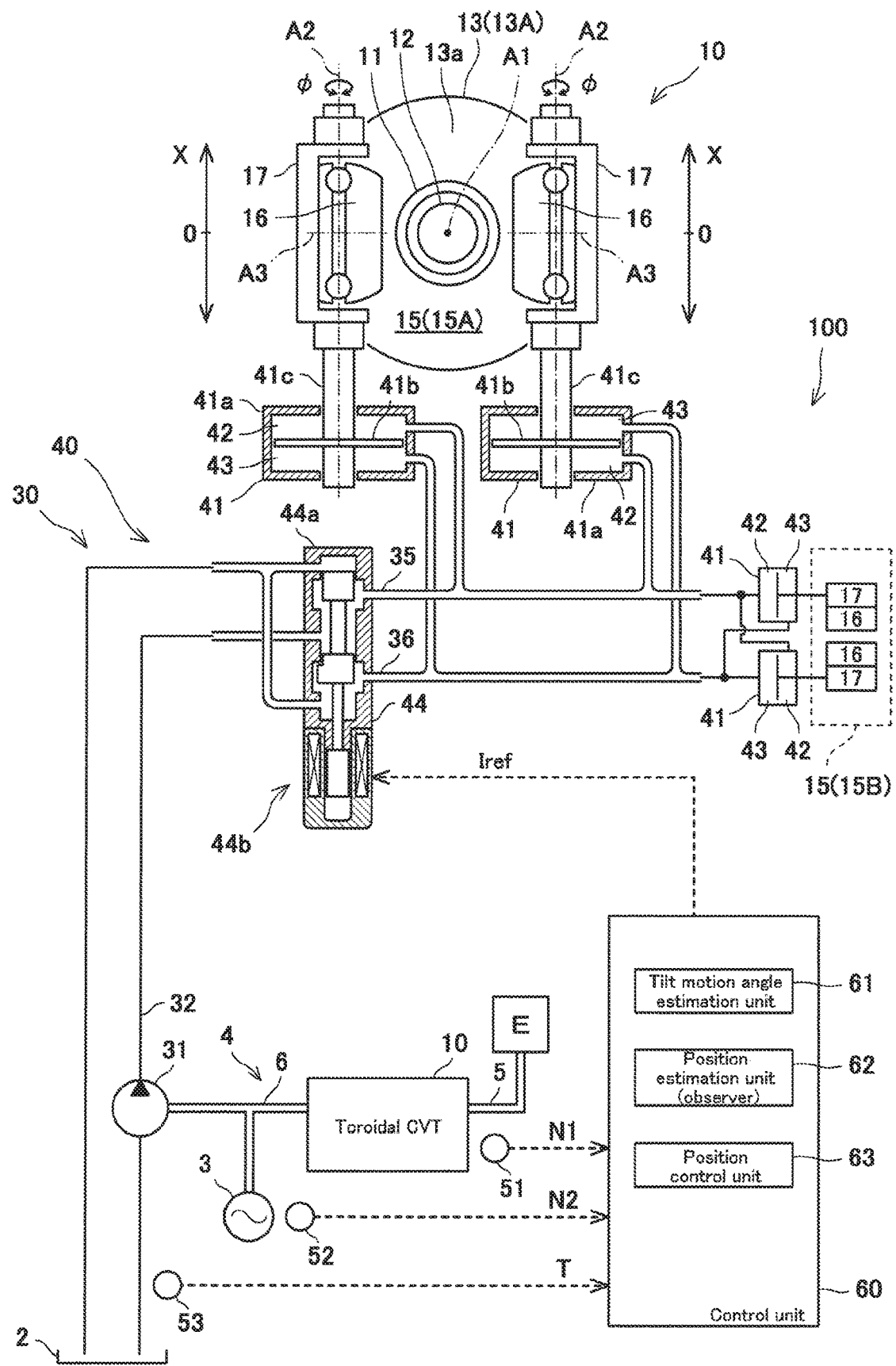
FIG. 2 is a schematic view of a transmission controller according to Embodiment 1.

As shown in FIG. 2, the actuator 40 changes the roller positions X, and thereby the tilt motion angle φ and the transmission ratio are adjusted. The actuator 40 is a hydraulic servo mechanism including a plurality of hydraulic cylinders 41 and a servo valve 44. The actuator 40 constitutes a hydraulic system 30 of the IDG1. The hydraulic cylinders 41 correspond to the trunnions 17 and the power rollers 16 mounted on the trunnions 17, respectively, in a one-to-one correspondence.

In the hydraulic system 30, a hydraulic pump 31 is driven at a constant speed by the rotational driving power taken out of the output path 6 of the CSD 4 and discharges the oil from the casing 2. The hydraulic pump 31 is connected to the servo valve 44 of the actuator 40 via an oil supply line 32. The oil reserved in the casing 2 is supplied from the hydraulic pump 31 to the actuator 40 as the hydraulic oil for the actuator 40.

Each of the hydraulic cylinders 41 includes a body 41a, a piston 41b, and a rod 41c. The interior of the body 41a is separated into a speed increase oil chamber 42 and a speed reduction oil chamber 43 by the piston 41b. The rod 41c is placed coaxially with the tilt motion axis line A2. The rod 41c couples the piston 41b to the trunnion 17. The rod 41c is movable in the extension direction of the tilt motion axis line A2, together with the trunnion 17. When the oil is supplied to the speed increase oil chamber 42 and is discharged from the speed reduction oil chamber 43, the roller position X and the tilt motion angle φ are changed so that the transmission ratio is increased. When the oil is flowed in an opposite direction, the roller position X and the tilt motion angle φ are changed so that the transmission ratio is decreased.

The servo valve 44 includes a spool valve 44a including a spool, and a valve driving section 44b which adjusts a spool position. All of the speed increase oil chambers 42 are connected to a speed increase port of the spool valve 44a via an oil passage 35. All of the speed reduction oil chambers 43 are connected to a speed reduction port of the spool valve 44a via an oil passage 36. The valve driving section 44b adjusts a back pressure of the spool in response to a driving signal provided by the control unit 60 to displace the spool. In this way, the servo valve 44 controls the flow rates and pressures of the oil supplied to the speed increase oil chambers 42 and the speed reduction oil chambers 43. As a result, the roller positions X, the tilt motion angles φ and the transmission ratio are adjusted.

[Sensor]

The transmission controller 100 includes sensors for detecting input information required to control the transmission ratio, in addition to the above-described actuator 40 and control unit 60. The sensors include an input rotation speed sensor 51 which detects an input rotation speed N1 of the toroidal CVT 10, an output rotation speed sensor 52 which detects an output rotation speed N2 of the toroidal CVT 10, and an oil temperature sensor 53 which detects a hydraulic oil temperature T of the actuator 40. The transmission controller 100 does not include a sensor which detects the roller position X and a sensor which directly detects the tilt motion angle φ.

The input rotation speed N1 is not limited to the rotation speed NCVTin of the CVT input shaft 11 or the input discs 13. The input rotation speed N1 may be the rotation speed of the engine rotary shaft, or the rotation speed of any one of the members included in the input path 5. The output rotation speed N2 is not limited to the rotation speed NCVTout of the output discs 14 or the CVT output shaft 12. The output rotation speed N2 may be the rotation speed of any one of the members included in the output path 6, or the rotation speed of the generator shaft 7. Further, a PMG frequency of a permanent magnet type in the electric generator 3 is measured, and the measured frequency can be converted into the rotation speed of the generator shaft 7. Therefore, this frequency may be used as the output rotation speed N2.

[Control Unit]

Figure 3:
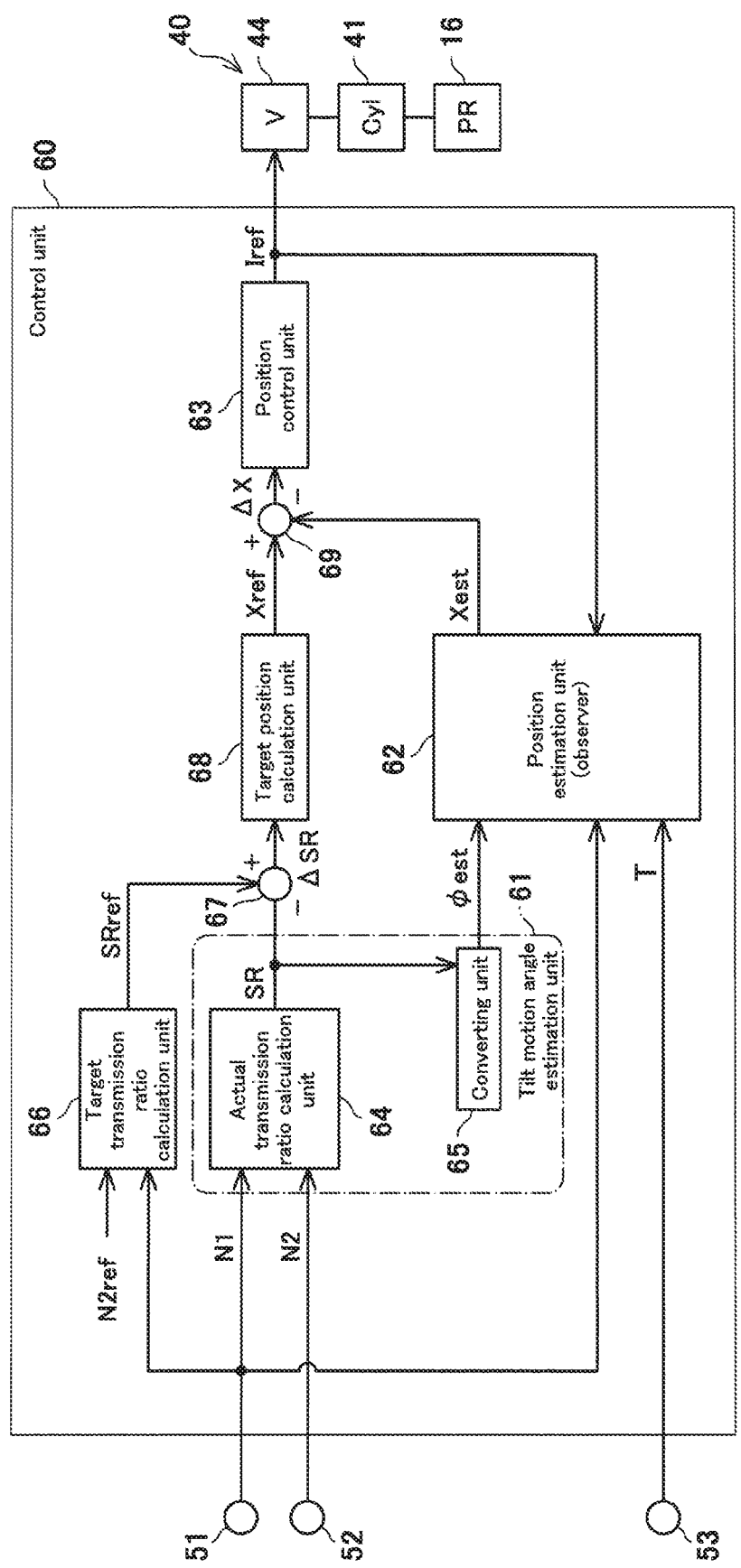
FIG. 3 is a block diagram of a transmission controller of FIG. 2.

As shown in FIG. 3, the control unit 60 includes a tilt motion angle estimation unit 61 which derives an estimated value φest of the tilt motion angle, a position estimation unit 62 which derives an estimated value Xest of the roller position, and a position control unit 63 which derives an operation command value Iref of the actuator 40 so that a deviation ΔX between a command value Xref and the estimated value Xest of the roller position is cancelled. The tilt motion angle estimation unit 61 is an example of a tilt motion angle information generation unit which generates information of the tilt motion angle φ. The tilt motion angle estimation unit 61 is configured to calculate the estimated value φest of the tilt motion angle without depending on a sensor which directly detects the tilt motion angle. The operation command value Iref is, for example, an output value (electric current value) of the driving signal provided to the servo valve 44 of the actuator 40.

The tilt motion angle estimation unit 61 includes an actual transmission ratio calculation unit 64 which derives an actual transmission ratio SR, and a converting unit 65 which converts the actual transmission ratio SR into the estimated value φest of the tilt motion angle. The actual transmission ratio calculation unit 64 derives the actual transmission ratio SR based on a ratio between the input rotation speed N1 detected by the input rotation speed sensor 51 and the output rotation speed N2 detected by the output rotation speed sensor 52 (SR=(N2/r2)/(N1×r1)=NCVTout/NCVTin). In this formula, r1 indicates a speed ratio in a driving power transmission path from a rotation member whose input rotation speed is detected by the input rotation speed sensor 51 to the input disc 13, and r2 indicates a speed ratio in a driving power transmission path from the output disc 14 to a rotation member whose output rotation speed is detected by the output rotation speed sensor 52.

The converting unit 65 derives the estimated value φest of the tilt motion angle based on the actual transmission ratio SR with reference to a inverse function (φ=f⁻¹ (SR)) of the function of the tilt motion angle φ with respect to the actual transmission ratio SR. Although the converting unit 65 may actually arithmetically calculate the inverse function, a table defining the inverse function may be pre-created to reduce a calculation load and stored in the control unit 60, and the converting unit 65 may derive the estimated value φest by table processing.

The control unit 60 includes a target transmission ratio calculation unit 66 which derives the command value SRref of the transmission ratio. The target transmission ratio calculation unit 66 derives the command value SRref of the transmission ratio based on a ratio between the input rotation speed N1 detected by the input rotation speed sensor 51 and the command value N2ref of the output rotation speed pre-stored (SRef=(N2ref/r2)/(N1×r1)). The transmission controller 100 is applied to the IDG1 (see FIG. 1). Therefore, the command value N2ref of the output rotation speed is set to a constant value corresponding to a frequency which is suitable to actuate electric components within the aircraft. For example, in a case where the target frequency fref is 400 Hz, the pole number of the electric generator 3 (see FIG. 1) is 2, and the output rotation speed detected by the output rotation speed sensor 52 is the rotation speed of the generator shaft 7, the command value N2ref is a constant value that is 24,000 rpm.

The control unit 60 includes a transmission ratio subtracter 67 which derives a deviation ΔSR between the command value SRref and the actual transmission ratio SR of the transmission ratio (ΔSR=SRef−SR). The control unit 60 includes a target position calculation unit 68 which derives the command value Xref of the roller position based on the deviation ΔSR of the transmission ratio. The command value Xref of the roller position is defined as a value which cancels the deviation ΔSR and makes the actual transmission ratio SR close to the command value Sref.

The control unit 60 includes a position subtracter 69 which derives a deviation ΔX between the command value Xref and the estimated value Xest of the roller position (ΔX=Xref−Xest). As described above, the position control unit 63 derives the operation command value Iref of the actuator 40 based on the deviation ΔX. The operation command value Iref is defined as a value which cancels the deviation ΔX and makes the estimated value Xest close to the command value Xref.

Since the driving signal indicated by the operation command value Iref is provided to the servo valve 44 of the actuator 40, the actual roller position becomes close to the command value Xref. Concurrently with this, the actual transmission ratio SR becomes close to the command value SRref and the output rotation speed N2 becomes close to the command value N2ref.

[Position Estimation Unit]

Figure 4:
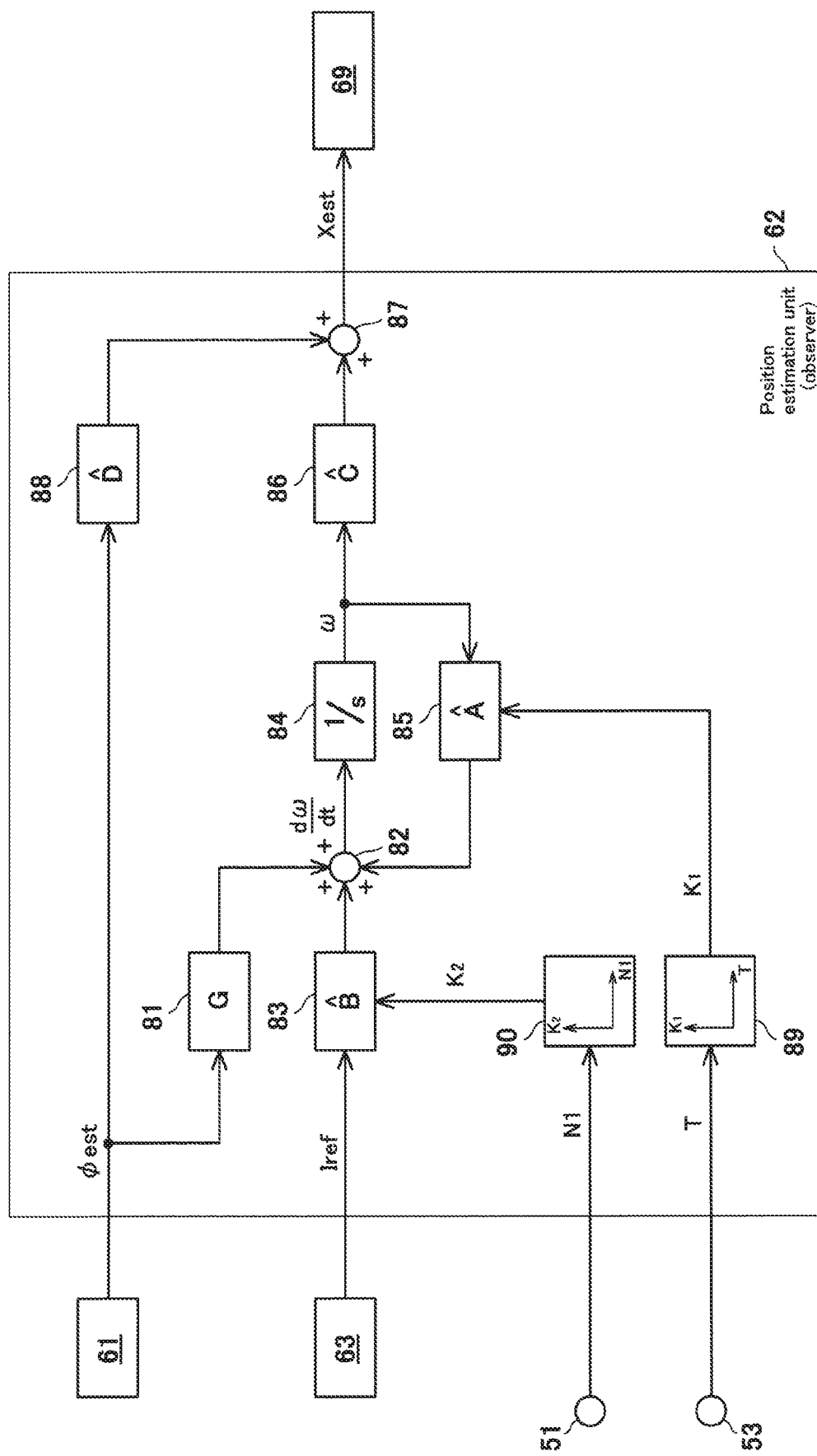
FIG. 4 is a block diagram of a position estimation unit of FIG. 3.

FIG. 4 is a block diagram showing the position estimation unit 62 of FIGS. 2 and 3. The position estimation unit 62 is an observer created by use of the model of the tilt motion angle φ and the model of the actuator 40, and is configured to estimate the roller position X. The model of the tilt motion angle φ is represented by the following formula (1) and the model of the actuator 40 is represented by the following formula (2).

$$\phi = \frac{K_2}{s(1+T_2 s)} X \quad (1)$$

$$X = \frac{K_1}{s} Iref \quad (2)$$

In the formulas, $K_1$ is a first proportional gain, $K_2$ is a second proportional gain, $T_2$ is a time constant, and s is a Laplace operator.

Based on the formula (1) and the formula (2), the model for designing the observer is represented by the following formula (3).

$$X \cong \frac{K}{s^2} Iref \quad (3)$$

In this formula, $K=K_1 K_2$, $T_2 \approx 0$

Next, matrixes A, B expressed as state spaces are divided as represented by the following formulas (4) to (6).

$$\frac{dx}{dt} = Ax + B Iref \quad (4)$$

$$X = Cx \quad (5)$$

$$\{A, B, C\} = \left\{ \begin{pmatrix} 0 & K_1 \\ 0 & 0 \end{pmatrix}, \begin{pmatrix} 0 \\ K_2 \end{pmatrix}, (1 \; 0) \right\} \quad (6)$$

In this formula, X is a state variable. In the case, the following formulas (7) and (8) are established.

$$A := \begin{pmatrix} A_{11} & A_{12} \\ A_{21} & A_{22} \end{pmatrix} \quad (7)$$

$$B := \begin{pmatrix} B_1 \\ B_2 \end{pmatrix} \quad (8)$$

Therefore, $A_{11}=A_{21}=A_{22}=B_1=0$, $A_{12}=K_1$, and $B_2=K_2$ are established.

Next, a design parameter L of determinant of matrix is introduced as represented by the following formula (9), and the pole of the observer (characteristic value of estimated matrix ˆA) is adjusted to become stable.

$$\hat{A} = A_{22} - L A_{12} \quad (9)$$

Other parameters (estimated matrix ˆB, matrix G, estimated matrix ˆC, and estimated matrix ˆD) are derived by use of the design parameter L according to the following formulas (10) to (13).

$$\hat{B} = -L B_1 + B_2 \quad (10)$$

$$G = \hat{A} L + A_{21} - L A_{11} \quad (11)$$

$$\hat{C} = \begin{pmatrix} 0 \\ 1 \end{pmatrix} \quad (12)$$

$$\hat{D} = \begin{pmatrix} 1 \\ L \end{pmatrix} \quad (13)$$

From the above, based on the model (see the formula (1)) of the tilt motion angle φ and the model (see the formula (2))

of the actuator 40, a minimum dimension observer indicated by the following formulas (14), (15) are derived.

$$\frac{d\omega}{dt} = \hat{A}\omega + \hat{B}Iref + G\varphi est \quad (14)$$

$$Xest = \hat{C}\omega + \hat{D}\varphi est \quad (15)$$

In the above formulas, ω is the state of the minimum dimension observer.

The position estimation unit 62 performs the calculation according to the formulas (14), (15), to derive the estimated value Xest (see formula (15)) of the roller position.

The signal flow in the position estimation unit 62 is as follows. The tilt motion angle estimation unit 61 provides the estimated value φest of the tilt motion angle to a calculation circuit 81 having the matrix G. The calculation circuit 81 provides Gφest (see formula (14)) to an adder 82. The position control unit 63 provides the operation command value Iref of the actuator 40 to a calculation circuit 83 of the estimated matrix ^B. The calculation circuit 83 provides ^BIref (see formula (14)) to the adder 82. The adder 82 outputs a signal to an integration circuit 84 having a transfer function 1/s. The integration circuit 84 outputs the state co to a calculation circuit 85 having the estimated matrix ^A. The calculation circuit 85 provides ^Aω (see formula (14)) to the adder 82. The adder 82 derives a differential value dω/dt of the state ω by adding ^Aω, ^BIref, and Gφest (see formula (14)), and provides the differential value dω/dt to the integration circuit 84.

The state ω is also provided to a calculation circuit 86 having the estimated matrix ^C. The calculation circuit 86 provides ^Cω (see formula (15)) to an adder 87. The tilt motion angle estimation unit 61 also provides the estimated value φest of the tilt motion angle to a calculation circuit 88 having the estimated matrix ^D. The calculation circuit 88 provides ^Dφest (see formula (15)) to the adder 87. The adder 87 derives the estimated value Xest of the roller position by adding ^Cω and ^Dφest (see formula (15)), and outputs the estimated value Xest to the position subtracter 69.

The calculation circuit 85 of the estimated matrix ^A derives the estimated matrix ^A based on the first proportional gain $K_1$ provided by the first gain setting unit 89 (see formulas (6) to (9)). The calculation circuit 83 of the estimated matrix ^B derives the estimated matrix ^B based on the second proportional gain $K_2$ provided by the second gain setting unit 90 (see formulas (6) to (10)). The calculation circuit 81 of the matrix G derives the matrix G based on the estimated matrix ^A provided by the calculation circuit 85 (see formulas (6) to (11)).

The position estimation unit 62 derives the estimated value Xest of the roller position based on the estimated value φest of the tilt motion angle and the operation command value Iref of the actuator 40 as described above. The estimated value Xest of the roller position is compensated based on environment parameter which is other than the tilt motion angle φ and the operation command value Iref of the actuator 40 and affects the operation of the power rollers 16. The environment parameter includes, for example, the hydraulic oil temperature T of the actuator 40, and the input rotation speed N1 of the toroidal CVT 10.

The first gain setting unit 89 sets the first proportional gain $K_1$ based on the hydraulic oil temperature T detected by the oil temperature sensor 53, with reference to a correspondence (e.g., a two-dimensional map, a table or a calculation formula) between the hydraulic oil temperature T and the first proportional gain $K_1$. The correspondence is stored in the control unit 60 such that the correspondence can be updated.

Figure 5A:
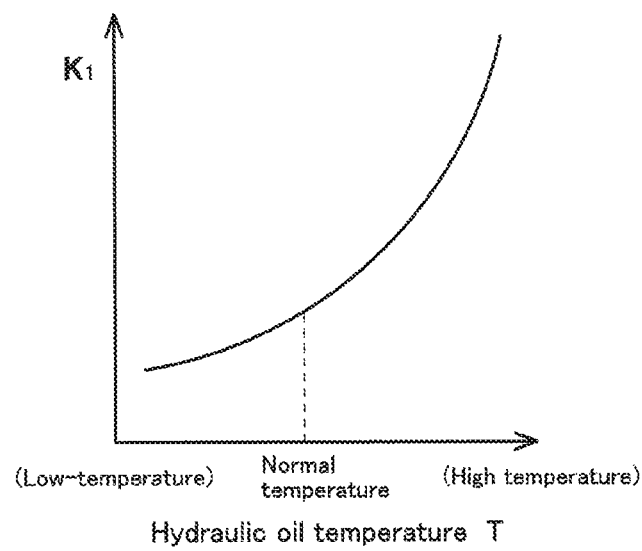
FIG. 5A is a graph showing a correspondence between a temperature of hydraulic oil and a first proportional gain.

FIG. 5A is a graph showing the correspondence. As shown in FIG. 5A, the first proportional gain $K_1$ is set to a smaller value and the estimated value Xest of the roller position is set to a smaller value as the hydraulic oil temperature T is lower. In other words, the position estimation unit 62 compensates the estimated value Xest of the roller position so that a rate of a change amount of the estimated value Xest of the roller position with respect to an increase amount of the operation command value Iref (electric current value) of the actuator 40 is smaller as the hydraulic oil temperature T detected by the oil temperature sensor 3 is lower.

The second gain setting unit 90 sets the second proportional gain $K_2$ based on the input rotation speed N1 detected by the input rotation speed sensor 51, with reference to a correspondence (e.g., a two-dimensional map, a table or a calculation formula) between the input rotation speed N1 and the second proportional gain $K_2$. The correspondence is stored in the control unit 60 such that the correspondence can be updated.

Figure 5B:
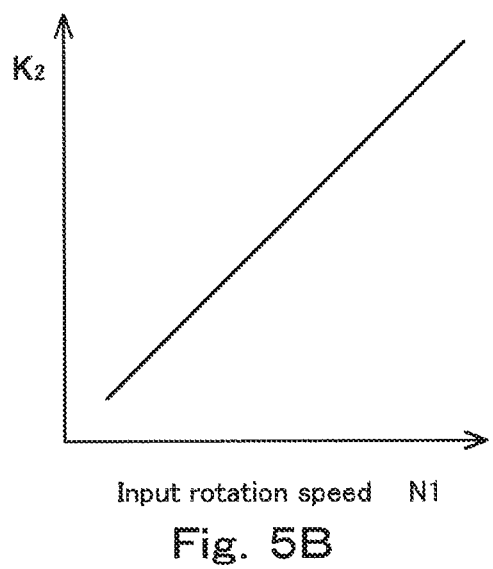
FIG. 5B is a graph showing a correspondence between an input rotation speed and a second proportional gain.

FIG. 5B is a graph showing the correspondence between the input rotation speed N1 and the second proportional gain $K_2$. As shown in FIG. 5B, the second proportional gain $K_2$ is set to a larger value and the estimated value Xest of the roller position is set to a larger value, as the input rotation speed N1 is higher. In other words, the position estimation unit 62 compensates the estimated value Xest of the roller position so that a rate of a change amount of the estimated value Xest of the roller position with respect to a change amount of the tilt motion angle φ is larger as the input rotation speed N1 detected by the input rotation speed sensor 51 is higher.

As described above, the position estimation unit 62 is configured to derive the estimated value Xest of the roller position based on the information (e.g., the estimated value φest of the tilt motion angle φ which is estimated by the tilt motion angle estimation unit 61) of the tilt motion angle φ which is generated by the tilt motion angle information generation unit and the operation command value Iref of the actuator 40. The position estimation unit 62 is configured to compensate the estimated value Xest of the roller position based on the environment parameter (e.g., T, N1) which affects the operation of the power roller 16.

In accordance with the above-described configuration, the position estimation unit 62 compensates the estimated value Xest of the roller position in view of the environment parameter which affects the operation of the power roller 16, independently of the tilt motion angle φ and the operation command value Iref. In other words, the estimated value Xest of the roller position is adjusted in response to a change in the environment parameter in a case where the environment parameter is changed under the condition in which the tilt motion angle φ is equal and the operation command value Iref is equal. Therefore, estimation accuracy of the roller position X can be improved, and a transmission control can be improved (the actual transmission ratio SR can be made close to the command value SRef).

The actuator 40 is a hydraulic (hydraulically powered) actuator. The environment parameter includes the hydraulic oil temperature T of the actuator 40. The hydraulic oil temperature T affects the viscosity of the hydraulic oil. The viscosity of the oil affects the responsivity of the operation of the actuator 40 and hence the responsivity of the displacement of the power roller 16. Even in a case where the responsivity of the displacement of the power roller 16 occurs under the influence of the hydraulic oil temperature T, the roller position X can be estimated in view of such a situation and estimation accuracy can be improved.

In particular, the estimated value Xest of the roller position is set to a smaller value as the hydraulic oil temperature T is lower. This makes it possible to well reflect a situation in which the responsivity of the displacement of the roller position X becomes low due to the increase in the viscosity of the oil which is caused by the decrease in the hydraulic oil temperature T. As a result, estimation accuracy can be improved.

Specifically, the position estimation unit 62 is constructed as the observer, and the observer is created based on two mathematical formula models represented by the formulas (1) and (2). One of the two mathematical formula models defines a relation between the operation command value Iref of the actuator 40 and the roller position X as represented by the formula (2). In a case where the hydraulic oil temperature T is changed, the first proportional gain $K_1$ within the corresponding mathematical formula model is adjusted. Since this calculation method is used in a case where the estimated value Xest of the roller position is compensated based on the hydraulic oil temperature T, it becomes possible to perform calculation adapted to a situation in which the responsivity of the operation of the actuator 40 and hence the responsivity of the displacement of the power rollers 16 are changed under the influence of the hydraulic oil temperature T. As a result, estimation accuracy can be improved.

The environment parameter includes the input rotation speed N1 of the toroidal CVT 10. As the input rotation speed N1 is increased, the sensitivity becomes high, and the power rollers 16 are easily tilted. Even in a case where easiness of the tilt motion of the power rollers 16 is changed under the influence of the input rotation speed N1, the roller positions X can be estimated in view of this situation. As a result, estimation accuracy can be improved.

As described above, the observer is created based on two mathematical formula models. One of the two mathematical formula models defines the relation between the roller position X and the tilt motion angle φ, as represented by the formula (1). As the input rotation speed N1 is changed, the second proportional gain $K_2$ within the corresponding mathematical formula model is adjusted. Since this calculation method is used in a case where the roller position X is compensated based on the input rotation speed N1, it becomes possible to perform calculation adapted to a situation in which easiness of the tilt motion of the power rollers 16 is changed under the influence of the input rotation speed N1. As a result, estimation accuracy can be improved.

[Exemplary Configurations of IDG, CVT, and Clamping Mechanism]

Turning back to FIG. 1, the exemplary configurations of the IDG1 to which the transmission controller 100 is applied, the toroidal CVT 10 provided in the IDG1, and the clamping mechanism 18 provided at the toroidal CVT 10 will be described in more detail.

The toroidal CVT 10 has a double cavity configuration. The toroidal CVT 10 includes two sets of input discs 13A, 13B, and output discs 14A, 14B. The two cavities 15A, 15B are arranged in the extension direction of the CVT axis line A1. The toroidal CVT 10 includes, for example, four power rollers 16 in total. When the actuator 40 receives the operation command from the control unit 60, four roller positions X and four tilt motion angles φ are adjusted so that the radius ratios of all of the power rollers 16 reach an equivalence (equal value) corresponding to the operation command value Iref.

The toroidal CVT 10 has a center input configuration. The two input discs 13A, 13B are disposed back-to-back on the CVT input shaft 11. The members forming the downstream end of the input path 5 are secured onto the CVT input shaft 11, and are disposed between the two input discs 13A, 13B. The CVT output shaft 12 is inserted into the CVT input shaft 11 with a hollow structure. The CVT output shaft 12 includes two protruding parts 21, 22 protruding from the CVT input shaft 11. The first output disc 14A is provided at the first protruding part 21 and faces the first input disc 13A. The second output disc 14B is provided at the second protruding part 22 and faces the second input disc 13B.

The clamping mechanism 18 is a cam-driven clamping mechanism. The clamping mechanism 18 includes a first cam disc 18a having a first cam surface 18b, a second cam disc 18c having a second cam surface 18d facing the first cam surface 18b in the axial direction of the CVT axis line A1, a plurality of taper rollers 18e sandwiched between the cam surfaces 18b, 18d in a state in which the taper rollers 18e are held in a holder 18f, and a pushing element 18g. In the center input configuration, the first cam disc 18a is provided at the second protruding part 22 of the output shaft 12. The second output disc 14B also serves as the second cam disc 18c. The second cam surface 18d is provided on the back surface of the second output disc 14B. The pushing element 18g is provided at the first protruding part 21. The first cam surface 18b and the second cam surface 18d have a shape in which concave and convex portions are alternately disposed in the circumferential direction.

When the second output disc 14B rotates, a circumferential position of the first cam surface 18b with respect to the second cam surface 18d is deviated, and the taper rollers 18e moved onto the convex portion of the first cam surface 18b push the second output disc 14B toward the second input disc 14B. This causes the power rollers 16 between the second input disc 13B and the second output disc 14B to be pushed against these discs 13A, 14A. Simultaneously, the first cam disc 18a pushes the second protruding part 22 to a side opposite a side to which the second output disc 14B is pushed. The first protruding part 21 and the pushing element 18g operate in response to this, and the pushing element 18g pushes the first output disc 14A toward the first input disc 13A. This causes the power rollers 16 between the first input disc 13A and the first output disc 14A to be pushed against these discs 13A, 14A.

In the center input configuration, the output path 6 includes an extended shaft 23 placed coaxially with the CVT output shaft 12, and the extended shaft 23 is joined to one of the protruding parts (e.g., second protruding part 22) via a dog clutch 24. Even in a case where the CVT output shaft 12 is displaced in the extension direction of the CVT axis line A1 by the action of the clamping mechanism 18, the driving power is transmitted from the CVT output shaft 12 to the extended shaft 23 via the dog clutch 24.

The IDG has a series configuration. The driving power transmission path 4a of the CSD 4 does not include a path which bypasses the toroidal CVT 10. Note that one or more auxiliary units of the IDG1, such as the hydraulic pump 31, are driven by the rotational driving power taken out of the input path 5 or the output path 6.

The input path 5 includes an IDG input shaft 101 to which the rotational driving power of the engine rotary shaft is input, and an input gear 102 which transmits the rotation of the IDG input shaft 101 to the toroidal CVT 10. The input gear 102 includes a driving gear 103 provided at the IDG input shaft 101 and a driven gear 104 which is provided at the IDG input shaft 101 and is in mesh with the driving gear 103. The IDG input shaft 101 is parallel to the CVT axis line A1 and the input gear 102 is a parallel shaft gear pair. In a case where the input rotation speed sensor 51 detects the rotation speed of the IDG input shaft 101, the rotation speed NCVTin of the input disc 13 can be derived by multiplying the detected input rotation speed N1 by the speed ratio of the input gear 102.

The output path 6 includes an output gear 111 which transmits the rotation output from the toroidal CVT 10 to the generator shaft 7. The generator shaft 7 is parallel to the CVT axis line A1. The output gear 111 is a parallel shaft gear train. In the center input configuration, the output gear 111 includes a driving gear 112 provided at the extended shaft 23, a driven gear 113 provided at the generator shaft 7, one or more (e.g., two) idle gears 114a, 114b which transmit the rotation of the driving gear 112 to the driven gear 113.

In a case where the output rotation speed sensor 52 detects the rotation speed of the generator shaft 7, the rotation speed NCVTout of the output disc 14 can be derived by dividing the detected output rotation speed N2 by the speed ratio of the output gear 111.

Embodiment 2

Figure 6:
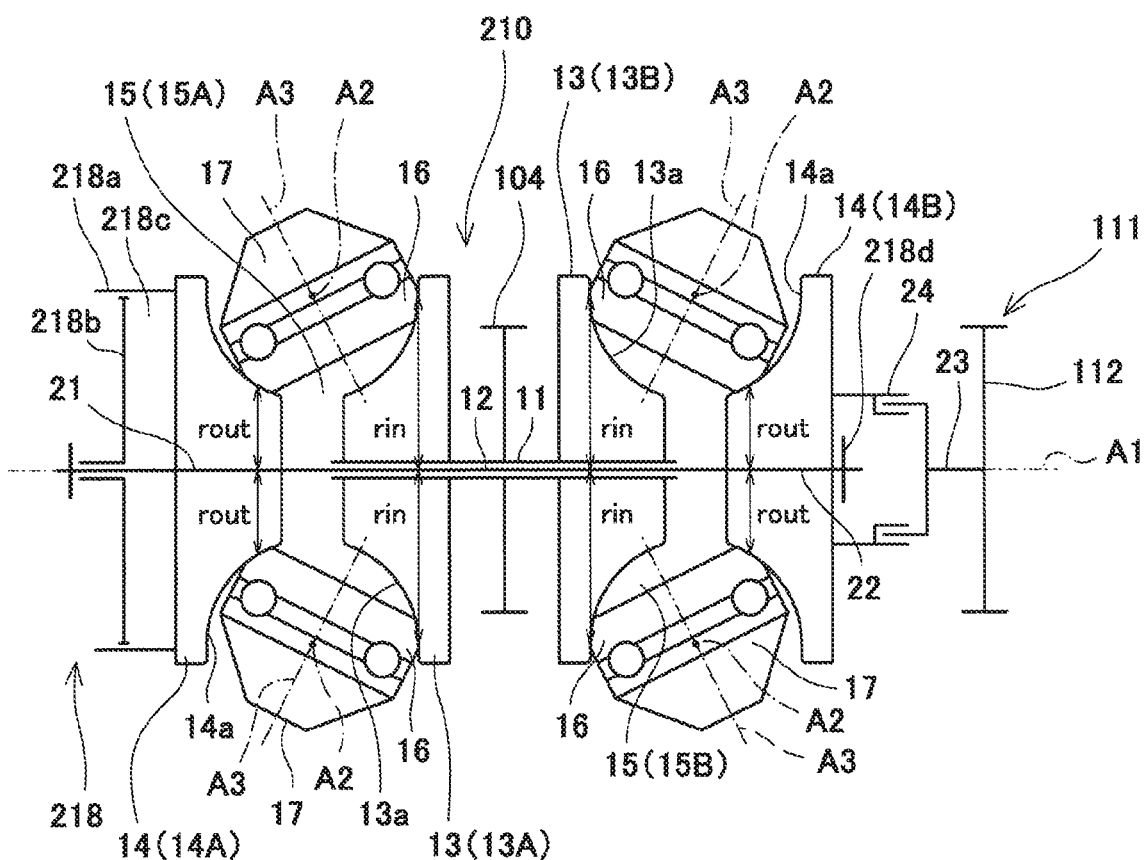
FIG. 6 is a skeleton diagram of a toroidal continuously variable transmission according to Embodiment 2.
Figure 7:
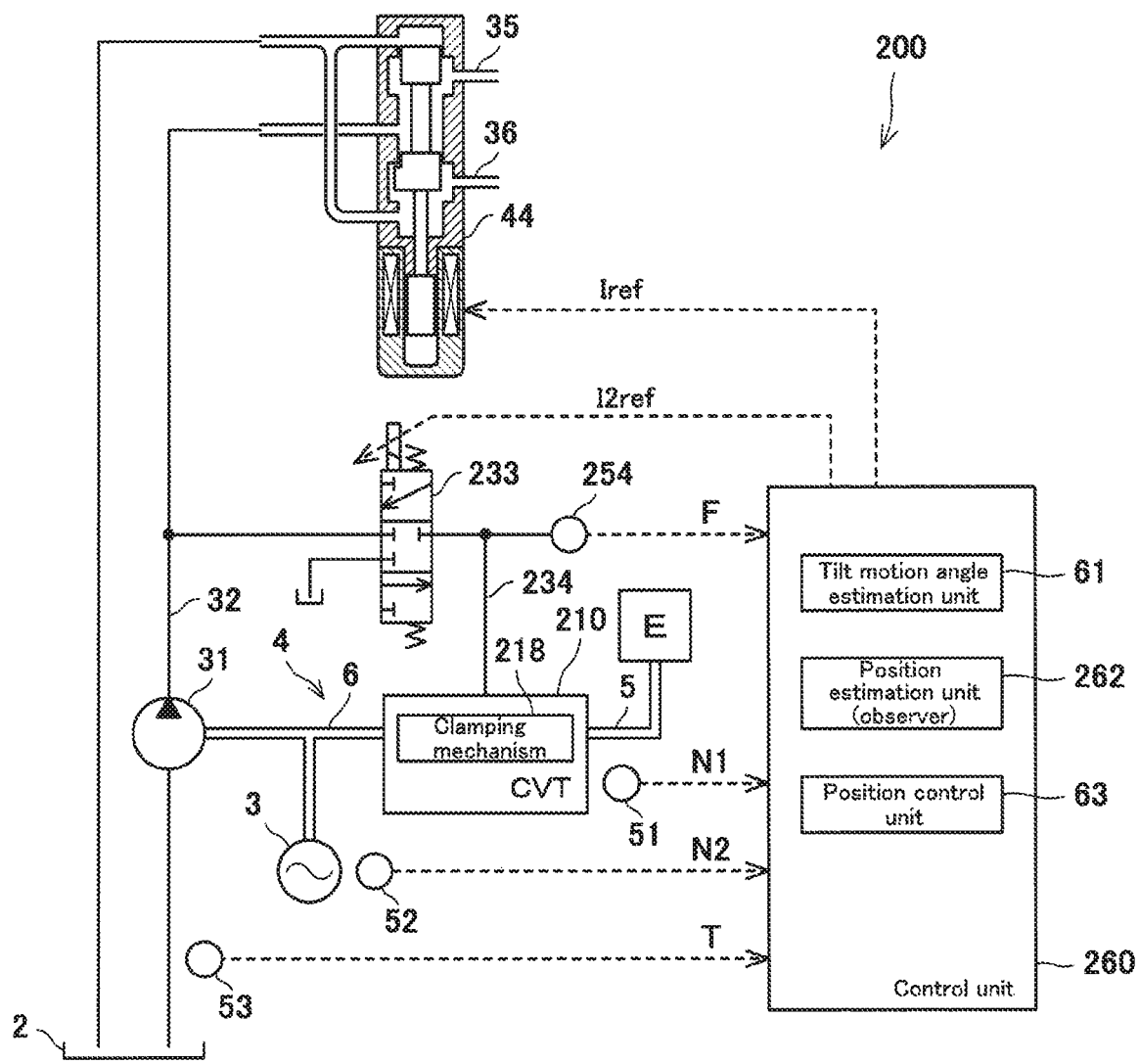
FIG. 7 is a schematic view of a transmission controller according to Embodiment 2.

FIG. 6 is a skeleton diagram of a toroidal CVT 210 according to Embodiment 2. FIG. 7 is a schematic view of a transmission controller 200 according to Embodiment 2. In the present embodiment, a clamping mechanism 218 is a hydraulic (hydraulically powered) clamping mechanism. The estimated value Xest of the roller position is compensated based on a clamping force F. Hereinafter, this will be mainly described regarding Embodiment 2.

As shown in FIG. 6, the clamping mechanism 218 includes a tubular part 218a, a clamping piston 218b, a clamping oil chamber 218c, and a pushing element 218d. The toroidal CVT 210 has a center input configuration. The clamping mechanism 218 is provided at the output discs 14A, 14B and the protruding parts 21, 22 of the CVT output shaft 12. The tubular part 218a protrudes from the back surface of the first output disc 14A. The clamping piston 218b is provided on the first protruding part 21 and is in slidable contact with the inner peripheral surface of the tubular part 218a in a liquid tightness state. The clamping oil chamber 218c is surrounded by the back surface of the first output disc 14A, the inner peripheral surface of the tubular part 218a, and the end surface of the clamping piston 218b. The pushing element 218d is secured onto the second protruding part 22 and is in contact with the back surface of the second output disc 214B.

As shown in FIG. 7, the hydraulic pump 31 is connected to a servo valve 233 for the clamping mechanism 218 via an oil supply line 32. The servo valve 233 is connected to the clamping mechanism 218 via an oil passage 234. The oil is supplied from the casing 2 to a clamping oil chamber 218c via the servo valve 233 by the hydraulic pump 31, and is used as the hydraulic oil for the clamping mechanism 218.

When the oil is supplied to the clamping oil chamber 218c, an oil pressure of this oil acts on the back surface of the first output disc 14A and the end surface of the clamping piston 218b. The first output disc 14A is pushed toward the first input disc 13A. This causes the power rollers 16 between the first input disc 13A and the first output disc 14A to be pushed against these discs 13A, 14A. Simultaneously, the clamping piston 218b pushes the first protruding part 21 to a side opposite to a side to which the first output disc 14A is pushed. In response to this, the pushing element 218d pushes the second output disc 14B toward the second input disc 13B. This causes the power rollers 16 between the second input disc 13B and the second output disc 14B to be pushed against these discs 13B, 14B The servo valve 233 controls the flow rate and pressure of the oil to be supplied to the clamping mechanism 18 in response to the driving signal provided by a control unit 260. Thus, the clamping force F generated by the clamping mechanism 218 is adjusted. As a supply oil pressure is higher, the clamping force F is greater correspondingly.

The transmission controller 200 includes a clamping force sensor 254 which detects the clamping force F generated by the clamping mechanism 218, as a sensor which detects input information required to control the transmission ratio. The clamping force F positively correlates with the pressure of the hydraulic oil supplied to the clamping mechanism 218. Therefore, the clamping force sensor 254 may be constituted by a hydraulic sensor (oil pressure sensor) which detects the pressure of the hydraulic oil flowing through the oil passage 234 connecting the servo valve 233 to the clamping mechanism 218.

Figure 8:
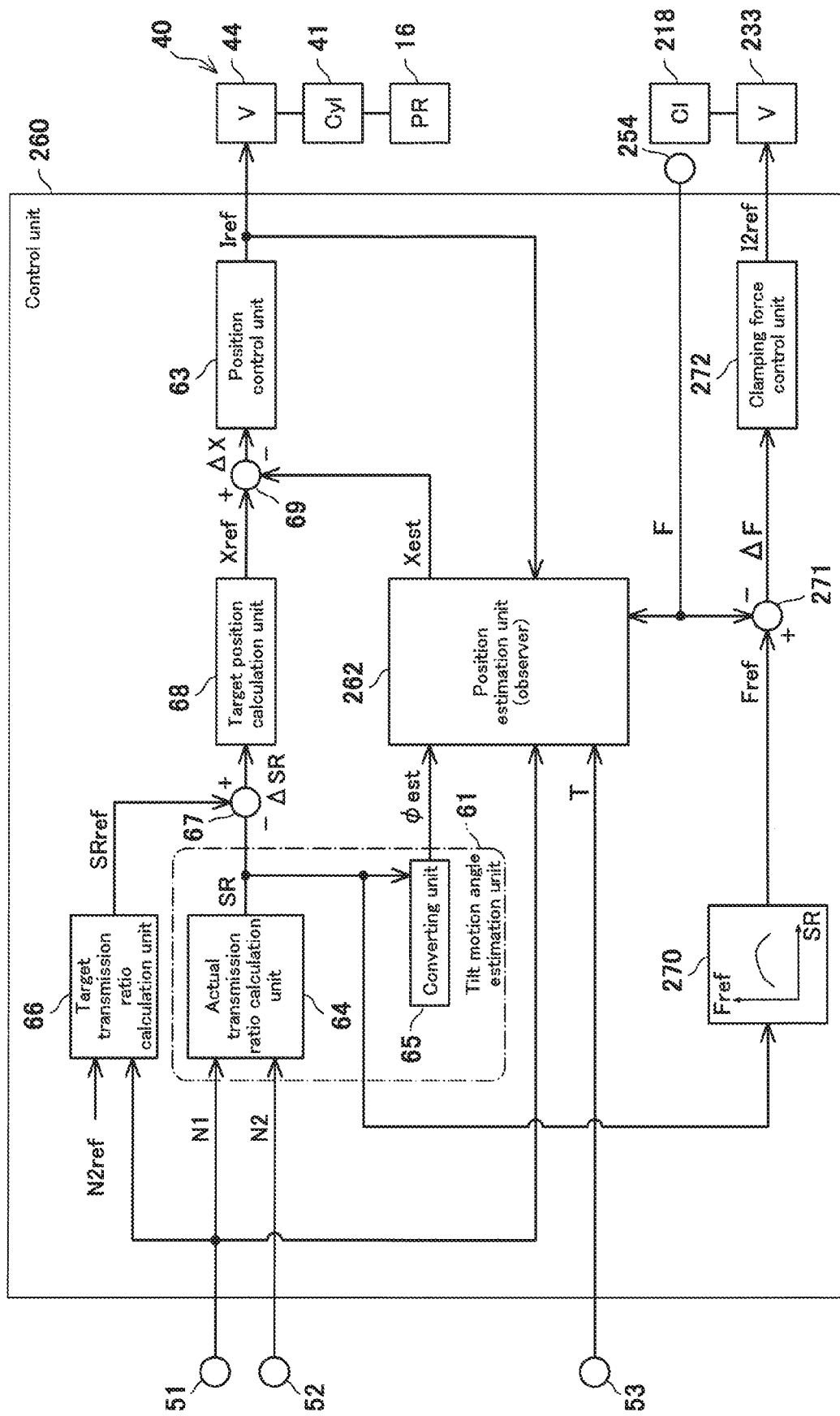
FIG. 8 is a block diagram of a transmission controller of FIG. 6.

As shown in FIG. 8, the control unit 260 includes a target clamping force calculation unit 270 which derives a command value Fref of the clamping force based on the actual transmission ratio SR or the estimated value φest of the tilt motion angle (FIG. 8 shows a case where the command value Fref of the clamping force is derived based on the actual transmission ratio SR), a clamping force subtracter 271 which derives a deviation ΔF between a detected value F and the command value Fref of the clamping force, and a clamping force control unit 272 which derives an operation command value I2ref of the servo valve 233 based on the deviation ΔF. The operation command value I2ref is, for example, an output value (electric current value) of the driving signal provided to the servo valve 233. The servo valve 233 receives the driving signal indicated by the operation command value I2ref, and thus the power rollers 16 are clamped to the discs 13, 14 (see FIG. 6) with a clamping force corresponding to the actual transmission ratio SR. In this way, it becomes possible to optimize driving power transmission efficiency in the toroidal CVT 210.

Figure 9:
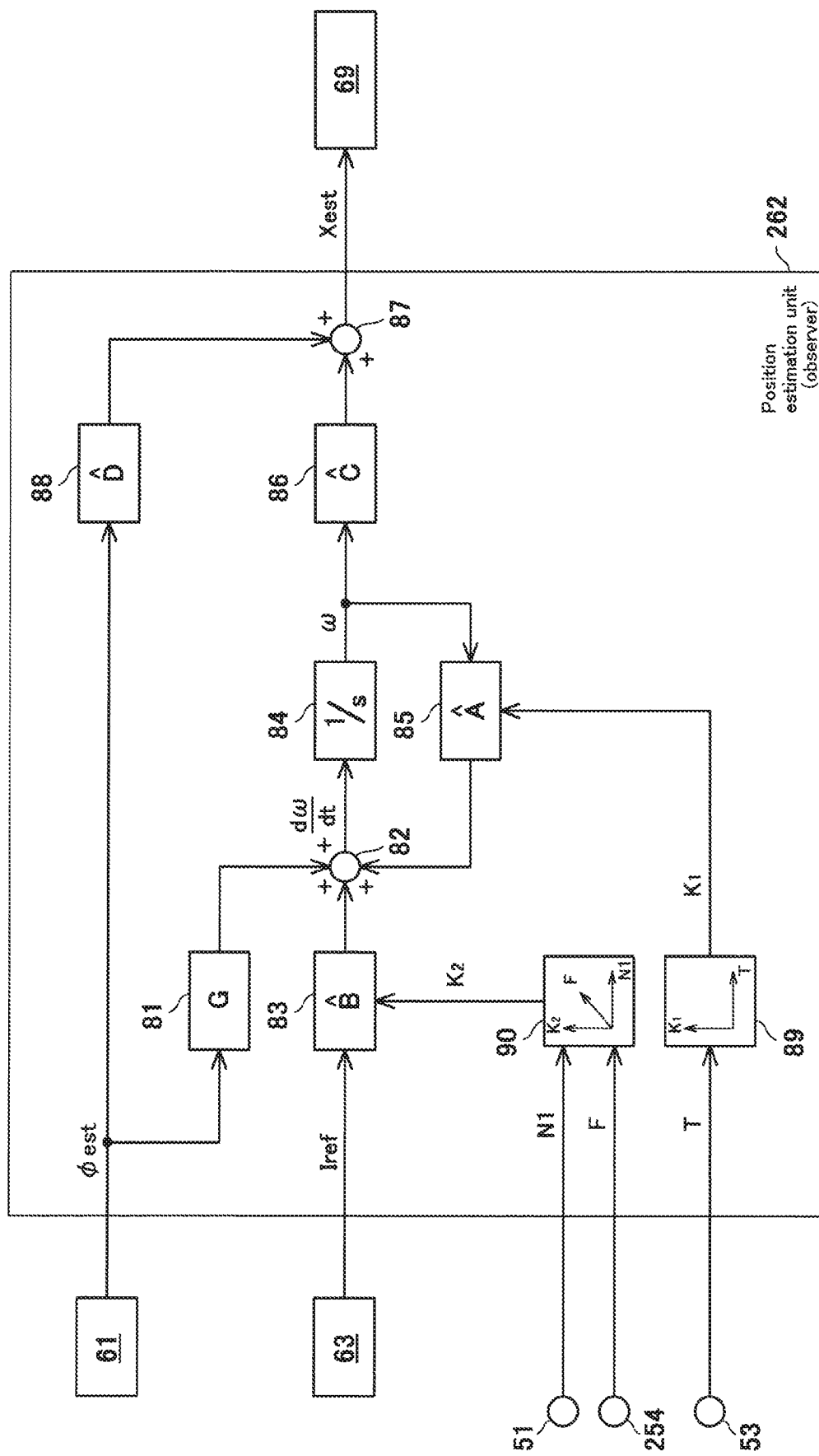
FIG. 9 is a block diagram of a position estimation unit of FIG. 7.

With reference to FIG. 9, a position estimation unit 262 compensates the estimated value Xest of the roller position based on the environment parameter which affects the operations of the power rollers 16, as in Embodiment 1. In the present embodiment, the environment parameter includes the clamping force F.

A second gain setting unit 290 sets the second proportional gain $K_2$ based on the input rotation speed N1 detected by the input rotation speed sensor 51 and the clamping force F detected by the clamping force sensor 254, with reference to a correspondence (e.g., a three-dimensional map, a table or a calculation formula) among the clamping force F, the input rotation speed N1 and the second proportional gain $K_2$.

Figure 10A:
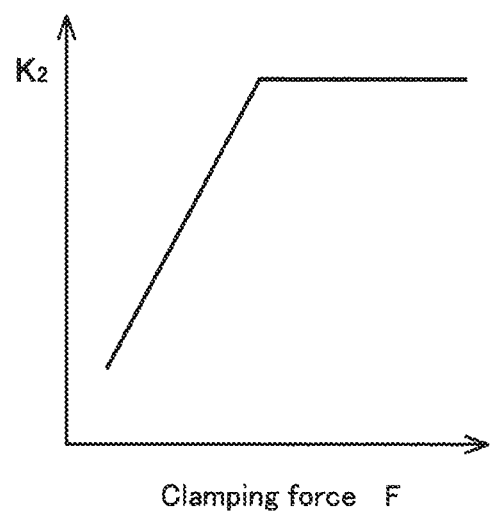
FIG. 10A is a graph showing a correspondence between a clamping force and the second proportional gain.
Figure 10B:
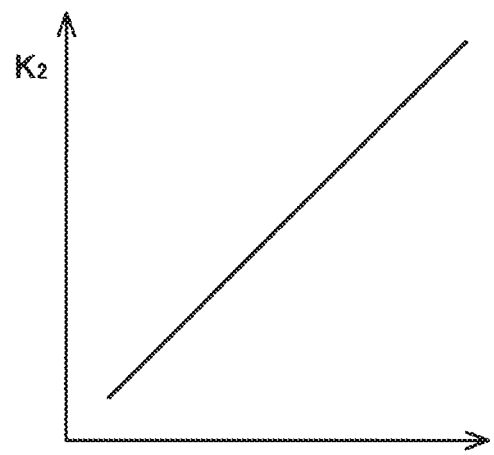
FIG. 10B is a graph showing a correspondence between an input rotation speed and the second proportional gain.

FIG. 10A is a graph showing a correspondence between the clamping force F and the second proportional gain $K_2$, under a condition in which the value of the input rotation speed N1 is constant. As shown in FIG. 10A, as the clamping force F is smaller, the second proportional gain $K_2$ is set to a smaller value, and thus the estimated value Xest of the roller position is set to a smaller value. FIG. 10 B is a graph showing a correspondence between the input rotation speed N1 and the second proportional gain $K_2$ under a condition in which the value of the clamping force is constant. FIG. 10B shows an example similar to that of Embodiment 1 (see FIG.

5B). The position estimation unit 262 compensates the estimated value Xest of the roller position so that a rate of a change amount of the estimated value Xest of the roller position with respect to a change amount of the tilt motion angle φ is increased as the clamping force F detected by the clamping force sensor 254 is larger or the input rotation speed N1 detected by the input rotation speed sensor 51 is higher.

In the present embodiment, the toroidal CVT 210 includes the clamping mechanism 218 which generates the clamping force F for pushing the power rollers against the input discs 13 and the output discs 14, and the environment parameter includes the clamping force F. The clamping force F affects easiness of the tilt motion of the power rollers 16. Even in a case where the easiness of the tilt motion of the power rollers 16 is changed under the influence of the clamping force F, the roller positions X can be estimated in view of the change in the easiness of the tilt motion of the power rollers 16. As a result, the estimation accuracy can be improved.

In particular, as the clamping force F is smaller, the estimated value Xest of the roller position is set to a smaller value. This makes it possible to well reflect a situation in which the power roller 16 is not easily tilted due to a small clamping force F, and a change in the tilt motion angle φ with respect to a change in the roller position X is less than a proper change. As a result, the estimation accuracy can be improved.

As described above, the observer is created based on the two mathematical formula models. As represented by the formula (1), one of the two mathematical formula models defines the relation between the roller position X and the tilt motion angle φ. As the clamping force F changes, the second proportional gain $K_2$ within the corresponding mathematic formula model is adjusted. Since this calculation method is used in a case where the roller position X is compensated based on the clamping force F, it becomes possible to perform calculation adapted to a situation in which easiness of the tilt motion of the power rollers 16 is changed under the influence of the clamping force F. As a result, the estimation accuracy can be improved.

Embodiment 3

Figure 11:
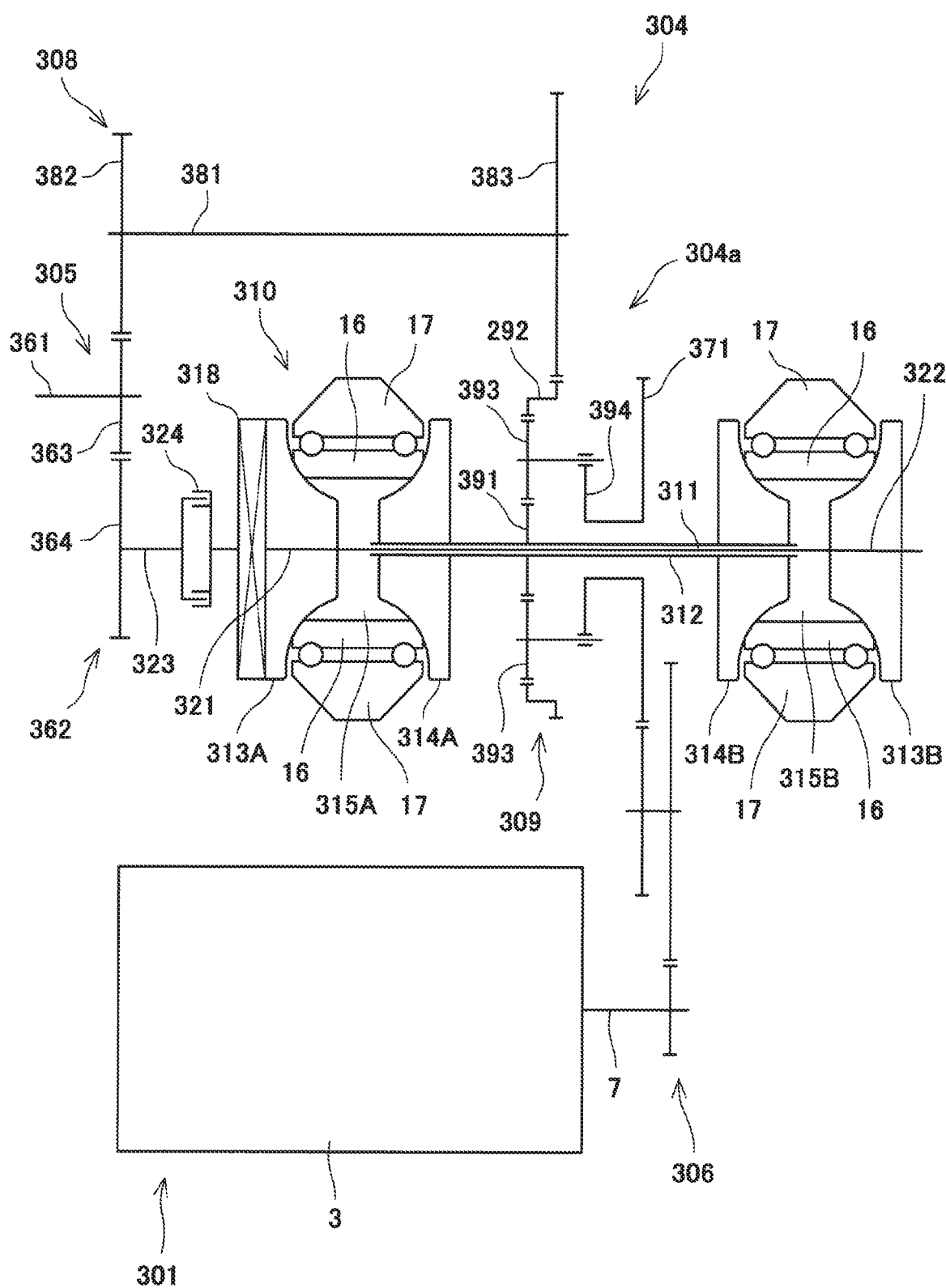
FIG. 11 is a skeleton diagram of an integrated drive generator (IDG) according to Embodiment 3.

FIG. 11 is a skeleton diagram of an IDG 301 according to Embodiment 3. Hereinafter, differences from Embodiment 1 will be mainly described, regarding Embodiment 3.

As shown in FIG. 11, a toroidal CVT 310 has a double-cavity configuration and a center-output configuration. A CVT input shaft 311 is inserted into a CVT output shaft 312 with a hollow structure, and includes two protruding parts 321, 322. Two input discs 313A, 313B are disposed back-to-back on the CVT output shaft 312. The first input disc 313A is provided at the first protruding part 321 and faces the first output disc 314A. The second input disc 313B is provided at the second protruding part 322 and faces the second output disc 314B. A clamping mechanism 318 is provided at the input discs 313A, 313B, and the protruding parts 321, 322. An input path 305 includes an extended shaft 323 which is placed coaxially with the CVT input shaft 311 and provided with a driven gear 364 of the input gear. The extended shaft 323 is coupled to one of the protruding parts (e.g., first protruding part 321) via a dog clutch 324.

The IDG 301 has a power split configuration. A driving power transmission path 304a of a CSD 304 includes a power dividing path 308 which branches from the input path 305 and bypasses the toroidal CVT 310. The CSD 304 includes an epicyclic gear mechanism 309 connected to the toroidal CVT 310, the downstream end of the power dividing path 308, and the upstream end of an output path 306. In the center output configuration, the epicyclic gear mechanism 309 and the upstream end of the output path 306 are disposed between two cavities 315A, 315B.

The power dividing path 308 includes a power dividing shaft 381, a first gear 382 which is provided at the power dividing shaft 381 and is in mesh with a driving gear 363 of an input gear 362, and a second gear 383 provided at the power dividing shaft 381. The epicyclic gear mechanism 309 includes a sun gear 391, a ring gear 392, a planet gear 393, and a carrier 394. The epicyclic gear mechanism 309 is placed coaxially with the CVT axis line A1. The sun gear 391 is provided on the CVT output shaft 312. The ring gear 392 includes an external tooth and an internal tooth. The second gear 383 of the power dividing path 308 is in mesh with the external tooth of the ring gear 392. The planet gear 393 is in mesh with the internal tooth of the sun gear 391 and the internal tooth of the ring gear 392. The planet gear 393 is supported by the carrier 394 in such a manner that the planet gear 393 is rotatable around its axis. An external gear 371 forming the upstream end of the output path 306 is provided at the carrier 394. A CVT output shaft 312 penetrates the carrier 394 and the external gear 371. The sun gear 391, the ring gear 392, and the carrier 394 are not fixed and are rotatable relative to each other. The planet gear 393 is rotatable around its axis and is able to revolve (revolvable).

In the above-described configuration, the rotational driving power of an IDG input shaft 361 is input to the toroidal CVT 310 via the input gear 362, the extended shaft 323 and the dog clutch 324. The rotational driving power is also sent to the power dividing path 308 via the input gear 362. The rotation output from the toroidal CVT 310 is input to the sun gear 391 of the epicyclic gear mechanism 309. The rotation output from the power dividing path 308 is input to the ring gear 392 of the epicyclic gear mechanism 309. These two rotations are put together in the epicyclic gear mechanism 309 and output to the carrier 394. Then, the rotation is transmitted to the generator shaft 7 via the output path 306.

The above-described transmission controllers 100, 200 are also applicable to the IDG 301 according to Embodiment 3.

The embodiments have been described above. The above-described configuration is exemplary, and can be suitably changed within the scope of the present invention. As the tilt motion angle generation unit, a sensor which detects the tilt motion angle may be used instead of the tilt motion angle estimation unit. In a case where the cam-driven clamping mechanism is used, the second proportional gain may be adjusted based on the parameter indicating the clamping force. For example, in a case where the inclination angles of the cam surfaces 18a, 18b over which the taper rollers 18e roll are adjusted, the sensitivity of the clamping mechanism is changed. In light of this, the second proportional gain $K_2$ may be compensated or adjusted based on the inclination angles of the cam surfaces 18a, 18b.

REFERENCE SIGNS LIST 1, 301 integrated drive generator (IDG)
10, 210, 310 toroidal continuously variable transmission (toroidal CVT)
13, 313A, 313B input disc
14, 314A, 314B output disc
16 power roller
18, 218, 318 clamping mechanism actuator 61 tilt motion angle estimation unit (tilt motion angle information generation unit)
62, 262 position estimation unit
63 position control unit
100, 200 transmission controller
F clamping force
Iref operation command value of actuator
N1 input rotation speed
T hydraulic oil temperature
X roller position
Xest estimated value of roller position
Xref command value of roller position
ΔX deviation of roller position
φ tilt motion angle
φest estimated value of tilt motion angle

The invention claimed is:

1. A transmission controller which controls a transmission ratio of a toroidal continuously variable transmission which continuously changes the transmission ratio based on a tilt motion angle of a power roller, the transmission controller comprising:
    an actuator which changes a roller position of the power roller to adjust the tilt motion angle;
    a tilt motion angle information generation unit which generates information of the tilt motion angle;
    a position estimation unit which derives an estimated value of the roller position; and
    a position control unit which derives an operation command value of the actuator so that a deviation between a command value of the roller position and the estimated value of the roller position is cancelled,
    wherein the position estimation unit is configured to derive the estimated value based on the information of the tilt motion angle which is generated by the tilt motion angle information generation unit, and the operation command value, and to compensate the estimated value based on an environment parameter which affects an operation of the power roller.

2. The transmission controller according to claim 1,
    wherein the toroidal continuously variable transmission constitutes a part of a driving power transmission path which transmits driving power of an engine rotary shaft of an aircraft to an electric generator mounted in the aircraft, and
    wherein the driving power transmission path does not include a path which bypasses the toroidal continuously variable transmission.

3. The transmission controller according to claim 2,
    wherein the actuator is a hydraulic actuator, and
    wherein the environment parameter includes a hydraulic oil temperature of the actuator.

4. The transmission controller according to claim 2,
    wherein the toroidal continuously variable transmission includes a clamping mechanism which generates a clamping force for pushing the power roller against an input disc and an output disc, and
    wherein the environment parameter includes the clamping force.

5. The transmission controller according to claim 2,
    wherein the environment parameter includes an input rotation speed of the toroidal continuously variable transmission.

6. The transmission controller according to claim 2,
    wherein the tilt motion angle information generation unit is constituted by an estimated angle estimation unit which generates an estimated value of the tilt motion angle as the information of the tilt motion angle, and
    wherein the estimated angle estimation unit includes an actual transmission ratio calculation unit which derives an actual transmission ratio of the toroidal continuously variable transmission, and a converting unit which derives the estimated value of the tilt motion angle based on the actual transmission ratio derived by the actual transmission ratio calculation unit, with reference to a inverse function of the tilt motion angle with respect to the actual transmission ratio.

7. The transmission controller according to claim 1,
    wherein the actuator is a hydraulic actuator, and
    wherein the environment parameter includes a hydraulic oil temperature of the actuator.

8. The transmission controller according to claim 7,
    wherein the toroidal continuously variable transmission includes a clamping mechanism which generates a clamping force for pushing the power roller against an input disc and an output disc, and
    wherein the environment parameter includes the clamping force.

9. The transmission controller according to claim 7,
    wherein the environment parameter includes an input rotation speed of the toroidal continuously variable transmission.

10. The transmission controller according to claim 7,
    wherein the tilt motion angle information generation unit is constituted by an estimated angle estimation unit which generates an estimated value of the tilt motion angle as the information of the tilt motion angle, and
    wherein the estimated angle estimation unit includes an actual transmission ratio calculation unit which derives an actual transmission ratio of the toroidal continuously variable transmission, and a converting unit which derives the estimated value of the tilt motion angle based on the actual transmission ratio derived by the actual transmission ratio calculation unit, with reference to a inverse function of the tilt motion angle with respect to the actual transmission ratio.

11. The transmission controller according to claim 1,
    wherein the toroidal continuously variable transmission includes a clamping mechanism which generates a clamping force for pushing the power roller against an input disc and an output disc, and
    wherein the environment parameter includes the clamping force.

12. The transmission controller according to claim 11,
    wherein the environment parameter includes an input rotation speed of the toroidal continuously variable transmission.

13. The transmission controller according to claim 11,
    wherein the tilt motion angle information generation unit is constituted by an estimated angle estimation unit which generates an estimated value of the tilt motion angle as the information of the tilt motion angle, and
    wherein the estimated angle estimation unit includes an actual transmission ratio calculation unit which derives an actual transmission ratio of the toroidal continuously variable transmission, and a converting unit which derives the estimated value of the tilt motion angle based on the actual transmission ratio derived by the actual transmission ratio calculation unit, with reference to a inverse function of the tilt motion angle with respect to the actual transmission ratio.

14. The transmission controller according to claim 1,
    wherein the environment parameter includes an input rotation speed of the toroidal continuously variable transmission.

15. The transmission controller according to claim 14, wherein the tilt motion angle information generation unit is constituted by an estimated angle estimation unit which generates an estimated value of the tilt motion angle as the information of the tilt motion angle, and wherein the estimated angle estimation unit includes an actual transmission ratio calculation unit which derives an actual transmission ratio of the toroidal continuously variable transmission, and a converting unit which derives the estimated value of the tilt motion angle based on the actual transmission ratio derived by the actual transmission ratio calculation unit, with reference to a inverse function of the tilt motion angle with respect to the actual transmission ratio.

16. The transmission controller according to claim 1, wherein the tilt motion angle information generation unit is constituted by an estimated angle estimation unit which generates an estimated value of the tilt motion angle as the information of the tilt motion angle, and wherein the estimated angle estimation unit includes an actual transmission ratio calculation unit which derives an actual transmission ratio of the toroidal continuously variable transmission, and a converting unit which derives the estimated value of the tilt motion angle based on the actual transmission ratio derived by the actual transmission ratio calculation unit, with reference to a inverse function of the tilt motion angle with respect to the actual transmission ratio.

\* \* \* \* \*